(12) United States Patent
Danine et al.

(10) Patent No.: US 10,545,387 B2
(45) Date of Patent: Jan. 28, 2020

(54) ELECTROCHROMIC DEVICE FOR APPLYING VOLTAGE TO ELECTRODES

(71) Applicant: CENTRE NATIONAL DE LA RECHERCHE SCIENTIFIQUE, Paris (FR)

(72) Inventors: Abdelaadim Danine, Gradignan (FR); Cyril Faure, Bourdeilles (FR); Guy Campet, Canejan (FR); Aline Rougier, Pessac (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 53 days.

(21) Appl. No.: 14/770,568

(22) PCT Filed: Mar. 6, 2014

(86) PCT No.: PCT/FR2014/050507
§ 371 (c)(1),
(2) Date: Aug. 26, 2015

(87) PCT Pub. No.: WO2014/135804
PCT Pub. Date: Sep. 12, 2014

(65) Prior Publication Data
US 2016/0011482 A1 Jan. 14, 2016

(30) Foreign Application Priority Data

Mar. 7, 2013 (FR) ...................... 13 52045

(51) Int. Cl.
*G02F 1/155* (2006.01)
*G02F 1/1523* (2019.01)
(Continued)

(52) U.S. Cl.
CPC ............ *G02F 1/155* (2013.01); *G02F 1/1525* (2013.01); *G02F 1/163* (2013.01);
(Continued)

(58) Field of Classification Search
CPC .................................. G02F 1/155; G02B 1/15
(Continued)

(56) References Cited

U.S. PATENT DOCUMENTS 5,995,273 A * 11/1999 Chandrasekhar ........ C09K 9/02
252/582
6,515,787 B1 * 2/2003 Westfall ................ G02F 1/1523
359/265
(Continued)

OTHER PUBLICATIONS

Papageorgiou, N., W. F. Maier, and M. Gratzel. "An Iodine/Triiodide Reduction Electrocatalyst for Aqueous and Organic Media." J. Electrochem. Soc. 144.3 (1997): 876-884. Print.*

*Primary Examiner* — Zachary W Wilkes
(74) *Attorney, Agent, or Firm* — Ipsilon USA, LLP (57) ABSTRACT

The invention relates to an electrochromic device comprising: a working electrode (2) comprising an electrochromic material containing at least one electrochromic polymer, said electrode being optionally in contact with a current collector (6); a solid electrolyte (3) which is in contact with each of said electrodes; and a counter-electrode (4) in a conductive metal material. The invention also relates to the various applications of such a device, especially for display.

10 Claims, 5 Drawing Sheets

(51) Int. Cl.
  *G02F 1/163* (2006.01)
  *G02F 1/1516* (2019.01)
  *G02F 1/15* (2019.01)
  *B60R 1/08* (2006.01)

(52) U.S. Cl.
  CPC .. *G02F 1/15165* (2019.01); *G02F 2001/1502* (2013.01); *G02F 2001/1555* (2013.01)

(58) Field of Classification Search
  USPC .................................................. 359/265–275
  See application file for complete search history.

(56) References Cited

U.S. PATENT DOCUMENTS

| | | | | |
|---|---|---|---|---|
| 7,054,050 | B2* | 5/2006 | Vincent | ................... G02F 1/155 359/268 |
| 7,301,687 | B2* | 11/2007 | Berggren | ................. C09K 9/02 359/265 |
| 2003/0156314 | A1* | 8/2003 | Shinozaki | ................. G02F 1/15 359/273 |
| 2003/0179432 | A1 | 9/2003 | Vincent et al. | |
| 2007/0020442 | A1 | 1/2007 | Giron et al. | |
| 2008/0212160 | A1 | 9/2008 | Fanton et al. | |
| 2010/0265562 | A1 | 10/2010 | Reynolds et al. | |

\* cited by examiner

ELECTROCHROMIC DEVICE FOR APPLYING VOLTAGE TO ELECTRODES

RELATED APPLICATIONS

This application is a National Phase Application of PCT/FR2014/050507, filed on Mar. 6, 2014, which in turn claims the benefit of priority from French Patent Application No. 13 52045 filed on Mar. 7, 2013, the entirety of which are incorporated herein by reference.

BACKGROUND

Field of the Invention

The present invention relates to an electrochromic device, and also to the various applications thereof, in particular for displays.

Description of Related Art

Electrochromic devices, comparable to optical batteries, modify their optical properties under the effect of an electric field, making it possible to thus obtain easily adjustable electrically-controlled coatings. Since the first commercialization at the end of the 1980s, and until very recently, their applications mainly concerned the visible range. The most common ones are motor vehicle rearview mirrors, motorcycle helmet visors, motor vehicle roof windows, and more recently glazing for buildings. Applications in the infrared range are being developed more and more, such as thermal protection (spatial application for satellites), and infrared camouflage in the military field.

Electrochromic devices generally consist of five layers trapped between two supports: a layer of an electrolyte material separating two layers of electrode materials, at least one of which is an electrochromic material (with anodic or cathodic coloration), said electrodes each being in contact, via their outer face, with a layer of a current collector material that is transparent in the visible range. These devices are generally illustrated by the following galvanic sequence: Substrate 1/TCO/EC1/I/EC2/TCO/Substrate 2 in which at least one of the substrates 1 and 2 is a transparent material selected in particular from glass, plastic, etc., it being possible for the other substrate to be opaque (paper for example) or reflective (metal for example), etc., TCO is a transparent conductive oxide used as current collector, EC is a layer of an electrochromic oxide having mixed (ionic and electronic) conduction and I is an electrolyte material having ionic conduction. This galvanic sequence is also referred to as an "electrochromic cell".

An electrochromic device functions like a battery, that is to say that it is possible to charge it or discharge it, via the TCO conductive layers deposited on the support. These conductive layers are in contact with the electrochromic materials that constitute the two electrodes EC1 and EC2. The electrolyte I is the layer that enables the displacement of the ions between the two electrodes EC1 and EC2. It acts as an ionic conductor but must have a very low electronic conduction. The voltage necessary for the operation is generally quite low, of the order of several volts. Depending on the direction of the current that is passed through, the device is colored: the light transmission decreases, or is bleached: the light transmission increases, this being due to modifications of the optical properties of the electrochromic materials of the electrodes EC1 and EC2.

In the visible range, the color sensation associated with the electrochromic devices remains subjective and may vary greatly from one individual to another. This is why the specific indicators of electrochromic performance are generally described using the measurement of the transmission (T), absorption (A) or reflection (R) spectra of the electrochromic cells. In a very simplified manner, these three quantities are related by the following relationship: R+T+A=1.

For electrochromic devices, two types of operation are distinguished:

1) operation in transmission mode for which the cell lets through the incident ray and there is practically no reflected light in the cell (R=0) hence: T+A=1. In this case, the counter electrode EC2 is an electrochromic material of complementary or neutral color.

2) operation in reflection mode, for which the electrochromic cell is opaque and reflects the incident ray in the form of a reflected ray (T=0) hence: R+A=1.

The oxides that can be used as TCOs in the electrochromic devices have an optical transparency in the visible range, and also a high electrical conductivity ($>10^3$ S·cm$^{-1}$). Most of these oxides are n-type conductors, having a forbidden band with a width greater than 3 eV. The state of the art in the field of (visible) TCOs corresponds to an electrical conductivity of the order of $10^4$ S·cm$^{-1}$, combined with a mean transmission of the order of 85% in the visible range. In order to achieve this transmission, the TCO layers are generally thin, of the order of 150 nm. The typical resistances of these films are of the order of 15 ohms/square. The state of the art and the most widely used of the TCOs remains tin-doped indium oxide $In_2O_3$:Sn (ITO) closely followed by fluorine-doped tin oxide $SnO_2$:F (FTO) and more recently gallium- or aluminum-doped zinc oxide.

The electrolytes of the electrochromic devices may be liquid, solid or in the form of membranes depending on the technology used.

Electrochromism covers a wide variety of compounds: from organic systems (viologens, conductive polymers), to hybrid systems (metallophthalocyanines, hexacyanometallates), via a wide range of oxides of transition metals (tungsten, molybdenum, tantalum, iridium, titanium, nickel, vanadium) and more recently hydrides and metals (J. N. Huiberts et al., Nature, 1996, 380, 321; T. J. Richardson et al., Appl. Phys. Lett., 2002, 78(30), 3047). Among these electrochromic materials, $WO_3$ remains by far the most studied and most commercialized material. These electrochromic oxides are grouped into two families: (i) oxides with cathodic coloration such as $WO_3$, which have a coloration in the reduced state, and (ii) oxides with anodic coloration, such as $IrO_x$ and $NiO_x$, which are colored in the oxidized state.

The phenomenon of coloring/bleaching in the visible range or of modifications of the optical properties more generally, results from a transfer of charge (ions/electrons) between thin layers. It may be formulated with the aid of the following equations (1) and (2):

(1)

or/and (2)

where <H> denotes a Host structure and M a guest ionic species. In theory, all monovalent ions may satisfy the reaction and be considered to be a guest species M; this applies for H$^+$, Li$^+$, Na$^+$, K$^+$, Ag$^+$ and OH$^-$. However, electrochemical reversibility and kinetics considerations mean that the ions of small ionic radii such as $H^+$, $Li^+$ and $OH^-$ are most commonly used.

Electrochromic cells operating with $Li^+$ ions have an obvious analogy with lithium ion rechargeable batteries and are therefore no more or no less than thin-film batteries, the optical properties of which vary reversibly with the charge/discharge. They are however subjected to a greater number of constraints and criteria of merit. The ideal characteristics of a system are of course a function of the desired application and of the field of study envisaged. In the visible range, the contrast in transmission between the colored and bleached state (($T_b/T_c$): $T_b=T_{bleached}$ and $T_c=T_{colored}$), and also the color efficiency ($CE=\log(T_b/T_c)/Q$: CE for color efficiency. Q=electrochemical capacity of the system) linking the electrochemical capacity with the contrast in transmission are the most important criteria. Among other more specific criteria, it is also important for the switching rate, which is defined as the time needed to change from one state to another, to be rapid and generally less than a minute for surface areas of the order of about a hundred $cm^2$. Finally, it is important for the electrochemical device to have a good durability, with a high number of cycles (>10 000 cycles for the glazing application).

The five-layer electrochromic devices as described above are however expensive to manufacture and do not always have a sufficient speed of switching and sufficient optical contrast. They furthermore require a high power source considering the width of the potential window necessary for the operation thereof.

OBJECTS AND SUMMARY

This is why the inventors set themselves the objective of developing electrochromic devices which are less expensive and easier to manufacture while minimizing the switching time and the energy needed for operation in comparison with the electrochromic devices known from the prior art.

A first subject of the present invention is therefore an electrochromic device comprising at least one electrochromic working electrode, a counter electrode, a solid electrolyte and optionally at most one current collector, said device additionally comprising means for applying a voltage to said electrodes and being characterized in that:
the working electrode comprises an electrochromic material containing at least one electrochromic polymer, said electrode optionally being in contact with a current collector,
the solid electrolyte is in contact with each of said electrodes,
the counter electrode is a conductive metal material (MC), the redox potential of which corresponds to the upper potential of the potential window for operation of said electrochromic device.

Such a device is inexpensive to prepare and furthermore has a switching rate that is around 5 to 10 times faster than that of certain standard electrochromic systems. The use of a metal material as counter electrode makes it possible to do away with the need to use a current collector that would be in contact with the counter electrode, due to the fact that the metal material constituting the counter electrode is itself conductive. This makes it possible at least to reduce the maximum number of layers present in the device in accordance with the invention to four. Moreover, by using an MC having a suitable oxidation potential, the operation of the electrochromic device only requires a low voltage, it being possible, for example, for this to be less than 1 V. Furthermore, in the electrochromic device in accordance with the present invention, novel electrochemical processes have been demonstrated thanks to the use of the MC which is in contact with the electrolyte. These systems are innovative in the sense that they use MCs that are oxidized and reduced reversibly during the operation of the electrochromic device. The mechanism present in conventional electrochromic systems is described by the following equation (3):

in which EC1 and EC2 respectively represent the electrochromic materials of the electrodes and M is a guest ionic species. In this case, M migrates reversibly from one electrode to the other (from EC1 to EC2) via the conductive electrolyte of the guest ionic species M.

In the electrochromic device in accordance with the present invention, the guest ionic species is a cation "$M^+$" resulting from the electrolyte ($I=M^++P^-$) which reacts reversibly with EC1. Simultaneously MC is oxidized reversibly releasing $MC^{z+}$ into the electrolyte thus ensuring the electrical neutrality of the system. Thus, MC simultaneously acts as counter electrode and current collector. This phenomenon may be represented by the following equation (4):

The upper limit of the potential window for operation of the electrochromic device in accordance with the invention is generally less than 1.5 V and preferably less than 0.7 V.

According to the invention, the electrochromic polymers of the working electrode may in particular be selected from poly(3,4-ethylenedioxythiophene) (PEDOT), poly(3,4-ethylenedioxyselenophene) (or PEDOS), poly(3,4-propylenedioxythiophene) (or PProDOT), 4,7-bis(2,3-dihydrothieno [3,4-b][1,4]dioxin-5-yl)-2-phenyl-1H-benzo[d]imidazole (or BImBEd), 1,4-bis(2-(3,4-ethylenedioxy)thienyl)-benzene (or BEDOT-B), copolymers based on pyrrole and on 3,4-ethylenedioxythiophene (or EDOT) such as poly(2,2'-dipyrrol-1-yl[4,4']bithiazolyl-co-EDOT (or PyDBTH-co-EDOT), copolymers of 4-aminodiphenylamine and 4,4'-diaminodiphenylsulfone (or DAPsone), poly[2,5-di(2-thienyl)-1H-pyrrole-1-(p-benzoic acid)] (or poly-DPB), polymers of the family of alkyl carbazoles such as poly (9H—N-alkyl carbazoles) (or poly(9-NAC)), poly(3,6-dinitro-9H—N-alkyl carbazoles) (or poly(3,6-DN-9-NAC)) and poly(3,6-diamino-9H—N-alkyl carbazoles) (or poly(3,6-DA-9-NAC)) in which the alkyl radical may for example be a methyl radical; copolymers of tris[4-(2-thienyl)phenyl] amine (TTPPA) and 2,2'-bithiophene (BT), poly(tris(4-selen-2-yl)phenylamine (PTSePA), poly(2,3,5,6-tetrafluoroaniline) (PTFA), poly(3,4-ethylenedioxypyrrole), poly (aniline-co-ethyl 4-aminobenzoate), poly(1-(3-pyridinyl)-2, 5-di(2-thienyl)-1H-pyrrole) (poly(PTPy)) and poly(1-(1,10-phenanthrolinyl)-2,5-di(2-thienyl)-1H-pyrrole) (poly (PhenTPy)).

Among these electrochromic polymers, poly(3,4-ethylenedioxythiophene) (PEDOT) is particularly preferred.

The thickness of the working electrode generally varies from several nanometers to several microns. By way of example, the thickness of the working electrode may vary from 40 nm to 10 µm approximately.

According to one particular and preferred embodiment of the invention, the electrochromic device comprises only a single electrochromic working electrode.

According to the invention, a "solid" electrolyte is understood to mean an electrolyte that is in the form of a solid layer or membrane.

The solid electrolyte that can be used in the electrochromic device in accordance with the present invention may in particular be selected from:

i) ionic liquids gelled or plasticized by at least one gelling or plasticizing agent, ii) electrolytic solutions of at least one electrolyte salt and/or of at least one acid in solution in a solvent, said solutions being gelled or plasticized by at least one gelling or plasticizing agent, and iii) thin layers of a material selected from certain hydrated oxides such as, for example, hydrated $Ta_2O_5$ and hydrated $ZrO_2$.

The nature of the ionic liquids that can be used according to the invention is not critical. Ionic liquids are defined according to Wasserscheid and Welton [Wasserscheid, P. and Welton, T., *Ionic Liquids in Synthesis*, 2nd edition. Wiley-VCH, Weinheim: 2007] as being organic salts having a melting point below the boiling point of water. They consist of the combination of an anion and of a cation in stoichiometric proportions that ensure the electrical neutrality of the salt. The most widely used cations have a structure of ammonium, imidazolium, pyridinium, pyrrolidinium, phosphonium, thiazolium, quinolinium or tetraminium type. The anions are preferably selected from halides (F, Cl, Br, I); tetrafluoroborate ($BF_4$), hexafluorophosphate ($PF_6$), sulfate ($SO_4$) and hydrogen sulfate ($HSO_4$) anions; carboxylate anions, for example formate (HCOO), acetate ($CH_3COO$), trifluoroacetate ($CF_3COO$) and propanoate ($CH_3$—$CH_2$—COO) anions; sulfonylimide anions, for example, bis((trifluoromethyl)sulfonyl)imide (($CF_3$—$SO_2$)$_2$N) and bis(methylsulfonyl)imide (($CH_3$—$SO_2$)$_2$N) anions; the dicyanamide ($N(CN)_2$) anion; sulfonate anions such as, for example, methylsulfonate ($CH_3SO_3$), trifluoromethylsulfonate ($CF_3SO_3$), benzenesulfonate ($C_6H_5$—$SO_3$), p-toluenesulfonate ($CH_3$—$C_6H_4$—$SO_3$) and perfluorobutylsulfonate ($C_4F_9SO_3$) anions; sulfinate anions such as, for example, trifluoromethanesulfinate ($CF_3SO_2$) and perfluorobutylsulfinate ($C_4F_9SO_2$) anions; phosphate anions such as, for example, dimethyl phosphate (($CH_3O)_2PO_2$), diethyl phosphate (($C_2H_5O)_2PO_2$), dihydrogen phosphate ($H_2PO_4$), hydrogen phosphate ($HPO_4$) and phosphate ($PO_4$) anions; phosphonate anions such as, for example, methyl phosphonate ($CH_3PO_3H$) and ethyl phosphonate ($C_2H_5PO_3H$) anions; and other anions such as, for example, hexafluoroarsenate ($AsF_6$), hexafluoroniobiate ($NbF_6$) and hexafluoroantimonate ($SbF_6$) anions.

Among such ionic liquids, mention may more particularly be made of 1-ethyl-3-methylimidazolium bis(trifluoromethanesulfonyl)imide (EMI-TFSI), 1-butyl-3-methylimidazolium bis(trifluoromethanesulfonyl)imide (BMITFSI), 1-butyl-3-methylimidazolium hexafluorophosphate ($BMIPF_6$), and mixtures thereof. Among these ionic liquids, BMITFSI is particularly preferred due to its wide electrochemical window.

The electrolyte salts that can be used according to the invention may for example be selected from lithium salts such as lithium bis(trifluoromethanesulfonyl) imide (LiTFSI), lithium perchlorate ($LiClO_4$), lithium hexafluorophosphate ($LiPF_6$), sodium salts such as, for example, sodium bis(trifluoromethanesulfonyl)imide (NaTFSI), and certain acids such as bis(trifluoromethanesulfonyl)imide acid (HTFSI), phosphoric acid and sulphuric acid.

The solvent of the electrolytic solutions defined in point iii) above may be selected from polar aprotic solvents such as, for example, cyclic and linear carbonates (for example ethylene carbonate, propylene carbonate, butylene carbonate, dimethyl carbonate, diethyl carbonate, dipropyl carbonate, ethyl methyl carbonate and vinylene carbonate), cyclic ethers (for example tetrahydrofuran), polyethylene glycol ethers of formula $RO(CH_2CH_2O)_nR'$ where R and R' are $CH_3$ or $C_2H_5$, and $1 \leq n \leq 12$, tetraalkyl sulfamides of formula $RR'NSO_2NR''R'''$ wherein R, R', R'' and R''' are $CH_3$ or $C_2H_5$, 3-methyl-1,3-oxazolidin-2-one and cyclic esters (for example γ-butyrolactone).

The solvent of the electrolytic solutions defined, in point ii) may also be an aqueous solvent such as water.

When the solid electrolyte of the electrochromic device in accordance with the invention is a gelled or plasticized ionic liquid, it may additionally contain at least one lithium salt. In such a case, this lithium salt is selected from the lithium salts that can be used as electrolyte salt in the solutions defined in point ii). These lithium salts then preferably represent a concentration of less than a few moles per liter of ionic liquid.

The solid electrolyte of the electrochromic device in accordance with the invention may additionally contain the redox couple $I_3^-/I^-$. The presence of such a redox couple in the electrolyte advantageously makes it possible to increase the electrochromic performance of the device.

The gelling agents that can be used to solidify the ionic liquids or the solutions of at least one electrolyte salt and/or of at least one acid may for example be selected from cellulose, nitrocellulose, carboxymethyl celluloses (CMCs), etc.

The plasticizing agents that can be used to solidify the ionic liquids or the solutions of at least one electrolyte salt and/or of at least one acid may for example be selected from pre-polymerized compounds or compounds that polymerize during the assembly of the electrochromic device and that result from the polymerization of one or more monomers selected from ethylene oxide, propylene oxide, methyl methacrylate, methyl acrylate, acrylonitrile, methacrylonitrile and vinylidene fluoride, said polymer having a crosslinked or uncrosslinked, statistical, alternating or block comb-type or linear-type structure. Among such polymers, mention may especially be made of polymethyl methacrylate (PMMA), polyethylene oxide (PEO), polyacrylonitrile (PAN), and mixtures thereof.

The amount of plasticizing and/or gelling agent present within the ionic liquid or within the electrolytic solution depends on the initial viscosity of the ionic liquid or of the electrolytic solution, on the nature thereof, etc.

When the solid electrolyte is a plasticized or gelled ionic liquid, the amount of plasticizing or gelling agent may vary from 20% to 70% approximately by weight relative to the weight of the ionic liquid and more preferably still from 40% to 50% approximately.

When the solid electrolyte is a plasticized or gelled electrolytic solution as defined above in point ii), the amount of plasticizing or gelling agent may vary from 20% to 80% by weight relative to the total weight of the initial electrolytic solution, and more preferably still from 30% to 60%.

As an example, when the solid electrolyte is BMITFSI and when it additionally contains a lithium salt such as LiTFSI, then the addition of 40% by weight approximately of PMMA is necessary and sufficient to obtain a solid electrolyte that adheres well to the electrodes while retaining sufficient ionic conductivity. As another example, when the solid electrolyte is BMITFSI but when it does not contain a lithium salt, then the amount of PMMA necessary and sufficient to obtain a solid electrolyte having the same mechanical properties as those of the BMITFSI-LiTFSI solid electrolyte above is 50% by weight.

The solid electrolyte preferably has a thickness that varies from several nanometers to several hundreds of micrometers approximately, and more preferably still from 100 nm to 50 µm.

As indicated above, the metal material of the counter electrode (MC) is selected from the metals for which the redox potential corresponds to the upper portion of the potential window for operation of said electrochromic device, typically 1.5 V at most. Among such metals, mention may especially be made of copper ($Cu^{2+}/Cu=0.34$ V), iron ($Fe^{2+}/Fe=0.4$ V), silver $Ag^+/Ag=0.8V$), platinum ($Pt^{2+}/Pt=1.2$ V), and gold ($Au^{3+}/Au=1.4$ V), silver being particularly preferred.

The conductive metal material of the counter electrode of the device in accordance with the invention may be in the form of a solid material, such as, for example, in the form of a sheet or a grid, or else it may also be used in the form of a thin layer (typically having a thickness of less than or equal to 20 µm) or else again in the form of a "discontinuous" material consisting for example of nanowires (percolating between them) and positioned on a substrate.

The thickness of the counter electrode may vary to a large extent. It may vary from several nanometers to several centimeters.

According to a first embodiment of the invention, the working electrode is in contact with a current collector, via the face which is opposite the one which is in contact with the solid electrolyte. In this case, the electrochromic device in accordance with the invention has 4 layers and comprises a current collector in contact with the working electrode (EC1), a counter electrode made of metal material (MC) and a solid electrolyte separating said electrodes.

According to this first embodiment, the current collector is then preferably selected from transparent conductive oxides, among which mention may for example be made of tin-doped indium oxide $In_2O_3$:Sn (ITO), fluorine-doped tin oxide $SnO_2$:F (FTO), zinc oxide doped with gallium or with aluminum (GZO or AZO) or else with silicon (ZnO:Si).

According to a second particular embodiment of the invention, the electrochromic material of the working electrode has a sufficient electronic conductivity so that the presence of a current collector in contact with the electrochromic working electrode is not necessary and the electrochromic device in accordance with the invention then solely consists of only 3 layers: an electrochromic working electrode (EC1), a solid electrolyte and a metal counter electrode (MC). This sufficient electronic conductivity of the electrochromic material is observed when the electrochromic polymers are selected from the polymers additionally having electronic conductivity properties and/or when the electrochromic material additionally comprises an agent that generates an electronic conductivity.

According to the invention, the expression "sufficient electronic conductivity" is understood to mean a conductivity greater than or equal to several tens of siemens per cm.

In other words, when the electrochromic device in accordance with the invention has a working electrode comprising an electrochromic material containing at least one electrochromic polymer having a sufficient electronic conductivity and/or at least one agent that generates an electronic conductivity, it is possible to completely do away with the current collector layers. The electrochromic device in accordance with the invention may then be composed of only 3 layers instead of the 5 layers conventionally used, without taking into account the substrates optionally used on either side of each of the electrodes.

Among the electrochromic polymers mentioned above, the polymers having a sufficient electronic conductivity may be selected from poly(3,4-ethylenedioxythiophene) (PEDOT), poly(3,4-ethylenedioxyselenophene) (or PEDOS), poly(3,4-propylenedioxythiophene) (or PProDOT), 4,7-bis(2,3-dihydrothieno[3,4-b][1,4]dioxin-5-yl)-2-phenyl-1H-benzo[d]imidazole (or BImBEd), 1,4-bis(2-(3,4-ethylenedioxy)thienyl)benzene (or BEDOT-B), copolymers based on pyrrole and on 3,4-ethylenedioxythiophene (or EDOT) such as poly(2,2'-dipyrrol-1-yl[4,4']-bithiazolyl-co-EDOT (or PyDBTH-co-EDOT), copolymers of 4-aminodiphenylamine and 4,4'-diaminodiphenylsulfone (or DAPsone), poly[2,5-di(2-thienyl)-1H-pyrrole-1-(p-benzoic acid)] (or poly-DPB), polymers of the family of alkyl carbazoles such as poly(9H—N-alkyl carbazoles) (or poly(9-NAC)), poly(3,6-dinitro-9H—N-alkyl carbazoles) (or poly(3,6-DN-9-NAC)) and poly(3,6-diamino-9H—N-alkyl carbazoles) (or poly(3,6-DA-9-NAC)) in which the alkyl radicals are for example a methyl radical.

Among these polymers, poly(3,4-ethylenedioxythiophene) (PEDOT) is particularly preferred.

The agent that generates an electronic conductivity that can be used in the electrochromic material of the working electrode in accordance with the invention may in particular be selected from conductive polymers different from the electrochromic polymers having an electronic conductivity mentioned above, and doped semiconducting oxides such as, for example, ZnO:Si or ZnO:Al.

Among such conductive polymers, mention may especially be made of poly(styrene sulfonate), substituted 1,1'-binaphthyl such as, for example, poly(6,6'-bis(2,2'-bithionophen-5-yl)-1,1'-bi-2,2'-naphthol), poly(1-hydroxy-2-methyloxy-benzene) (or PHMOB), poly(2,2'-dipyrrol-1-yl [4,4']bithiazolyl) (or PyDBTH), polyanilines, polypyrroles, polycarbazoles, polyindoles, polyazepines, polyfluorenes, polypyrenes, polyazulenes, polynaphthalenes and polythiophenes. On this occasion, a person skilled in the art will ensure that the use of these polymers is not incompatible with the intrinsic properties of the electrochromic device in accordance with the invention, in particular that the use of these polymers does not impair the electrochromism properties of the working electrode.

When they are used, the conductive polymers preferably represent from 2% to 75% of the monomers relative to the electrochromic monomers, and more preferably still from 5% to 30%.

Figure 1:
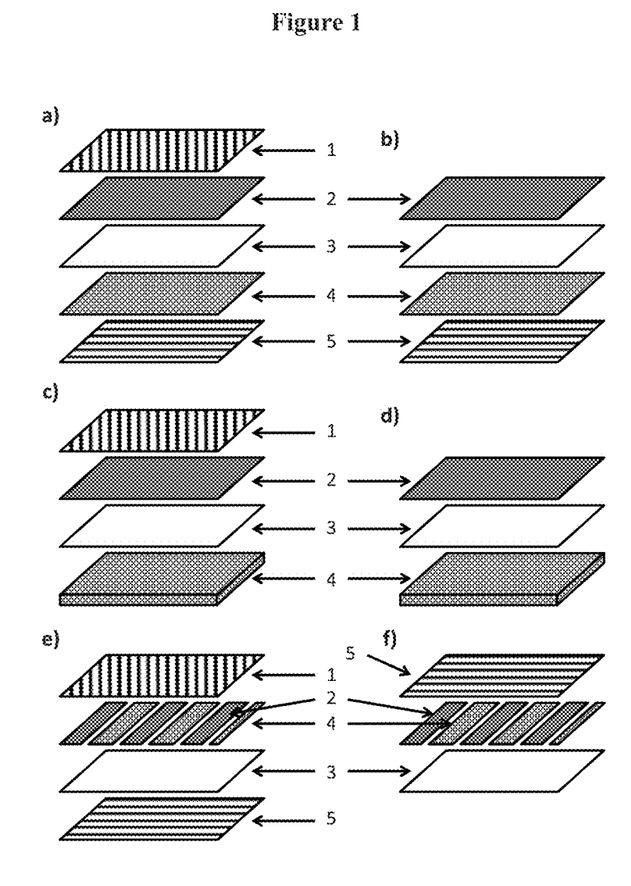
FIGS. 1a-1f illustrate configurations of the electrochromic device, according to one embodiment.

According to this second embodiment, various configurations of the electrochromic device are possible. These various configurations are illustrated in the appended FIG. 1.

According to a first configuration (see FIG. 1a), the electrochromic device comprises a substrate (1) on the working electrode side (Substrate 1), a working electrode made of an electrochromic material also having an electronic conductivity (2) (EC1), a solid electrolyte (3) (I), a counter electrode (4) made of a metal material (MC) and a substrate (5) for the counter electrode (4) (Substrate 2) (see FIG. 1a). According to this first configuration, and when the electrochromic conductive layer is self-supported, it is not necessary to use a substrate (1) (see FIG. 1b). Furthermore, in the devices represented in FIGS. 1a and 1b, the substrate (5) of the counter electrode (4) may additionally be optional when the counter electrode (4) has a sufficient thickness so as to give it a sufficient rigidity, this thickness generally being of the order of 100 μm to several cm approximately (FIGS. 1c and 1d).

DETAILED DESCRIPTION

According to a second configuration (see FIGS. 1e and 1f), the working electrode (2) and the metal counter electrode (4) are positioned side-by-side without being in contact, in the same plane and are in contact with the substrate (1) and the solid electrolyte (3), the solid electrolyte (3) itself optionally being supported by a substrate (5).

The substrate (5) of the counter electrode is an opaque, translucent or transparent material which may for example be selected from papers, plastics, textile materials, glasses, metals, ceramics, wood, etc. The substrate (1) optionally in contact with the electrochromic working electrode may be selected from translucent materials (such as tracing paper for example) and preferably transparent materials (such as glass, PET, etc).

The various parts of the electrochromic device in accordance with the invention may be prepared and assembled by all of the existing techniques for producing thin layers that are well known to those skilled in the art, such as, for example, by roll coating or roll-to-roll processing, flexographic printing, screenprinting, sputtering, dip coating, spin coating, application with a doctor blade, etc., or a mixture of these techniques. The assembled systems may be monolithic or laminated with an open or closed structure.

Finally, another subject of the invention is the various applications and uses of the electrochromic device as described above.

In particular, the electrochromic device in accordance with the invention may advantageously be used for:
  displaying data (screens for text and/or images, possible pixelization system, the creation of visual controls (On/Off, risks (e.g. electrical danger)), authentification of counterfeit products, etc.),
  manufacturing motor vehicle rearview mirrors and visors, in particular motorcycle helmet visors. In both these cases, the electrochromic device in accordance with the invention makes it possible to avoid the glare linked to the headlamps of other vehicles and glare from the sun respectively),
  manufacturing glazing for buildings (in particular in order to limit the intrusion or evacuation of heat into or from the rooms via the glazing during summer or winter respectively), or thermal stealth (optical camouflage in the infrared range), indeed certain electrochromic materials such as PEDOT can adjust their absorptions in the infrared range.

The present invention is illustrated by the examples below, to which it is not however limited.

Example 1

Preparation and Properties of a Four-Layer Electrochromic Device Using a Plasticized Ionic Liquid as Solid Electrolyte Preparation of the Device In this example, a four-layer electrochromic device having a sandwich structure was prepared, consisting of the following electrochemical sequence:
  transparent support made of polyethylene terephthalate (PET);
  current collector: tin-doped indium oxide (ITO);
  electrochromic working electrode: poly(3,4-ethylenedioxy)thiophene (PEDOT);
  solid electrolyte: the electrolyte was prepared using 1-butyl-3-methylimidazolium bis(trifluoromethylsulfonyl)imide (BMITFSI) and 50% by weight of PMMA as plasticizing agent;
  counter electrode/current collector: layer of silver metal ink (thickness=5-10 μm);
  support for the counter electrode: paper.

This device was produced using PEDOT film deposited industrially by the roll-to-roll method on a PET substrate covered with ITO by in situ polymerization. The silver metal ink was deposited by flexographic printing on the paper substrate. The solid electrolyte membrane was obtained by mixing BMITFSI (from Solvionic) with 50% by weight of PMMA using butan-2-one as common solvent. The ionic liquid is at this moment liquid. The ionic electrolyte in the liquid state was deposited on the paper substrate covered with the layer of silver ink by application with a doctor blade. The assembly was then heated at a temperature of around 100° C. to eliminate a portion of the butan-2-one so that the electrolyte forms a membrane that is not completely dry. At this moment, the PEDOT/ITO/PET substrate was applied to the surface and the drying was finished off in the oven at a temperature of around 110° C. in order to eliminate the rest of the solvent.

Figure 2:
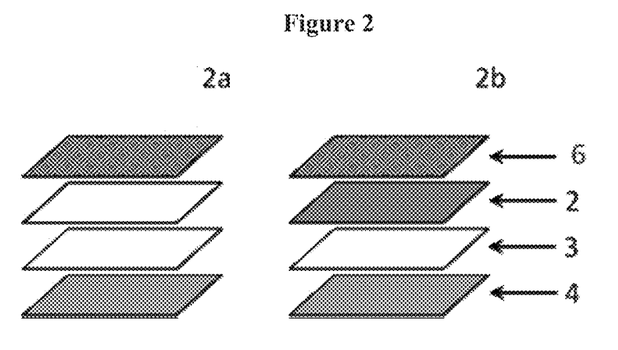
FIGS. 2a-2b illustrate configurations of the electrochromic device of Example 1, according to one embodiment.

This electrochromic device is represented schematically by the appended FIG. 2, in which it is possible to see the device in the bleached state (FIG. 2a) and in the colored state (FIG. 2b). It consists of a current collector (6) in contact with the electrochromic working electrode (2), which is separated from the counter electrode (4) by a layer of solid electrolyte (3). The PET support of the current collector and the paper support of the counter electrode are not represented in this figure.

Stability in Cyclic Chronoamperometry

Figure 3:
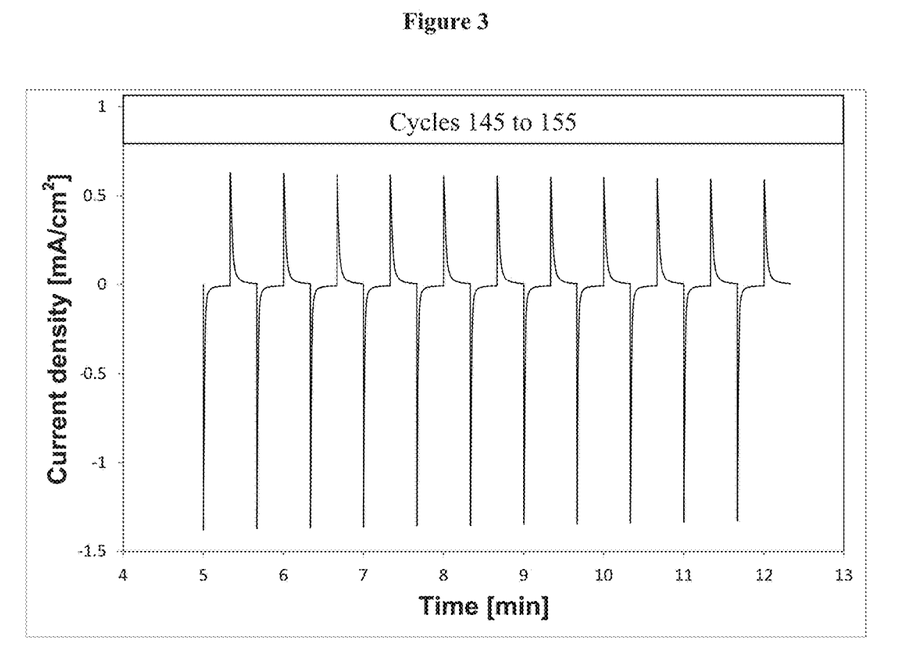
FIG. 3 is a graph of cycling results from Example 1, according to one embodiment.

The electrochemical stability of this electrochromic device, studied by chronoamperometric cycling, was evaluated firstly in a liquid medium by assembling 3 standard electrochemistry electrodes (i.e. films immersed in the electrolyte (BMITFSI without addition of PMMA). The appended FIG. 3 reports the cycling results of the $145^{th}$ to the $155^{th}$ cycle, the current density (in $mA/cm^2$) being a function of the time (in minutes) with a platinum electrode in the potential range 0.7 to −0.7 V vs an Hg/HgO reference electrode). The results reported in the appended FIG. 3 show the good cyclability of this electrochromic material after a formatting period of less than a hundred cycles. This assembly proves the electrochemical stability of the electrochromic material with respect to the electrolyte. The switching time at 90% of the PEDOT is 2 s when coloring and 4.5 s when bleaching under these conditions (±0.7 V vs Pt, ref Hg/HgO) and the surface capacity obtained is 1.4 $mC/cm^2$.

Figure 4:
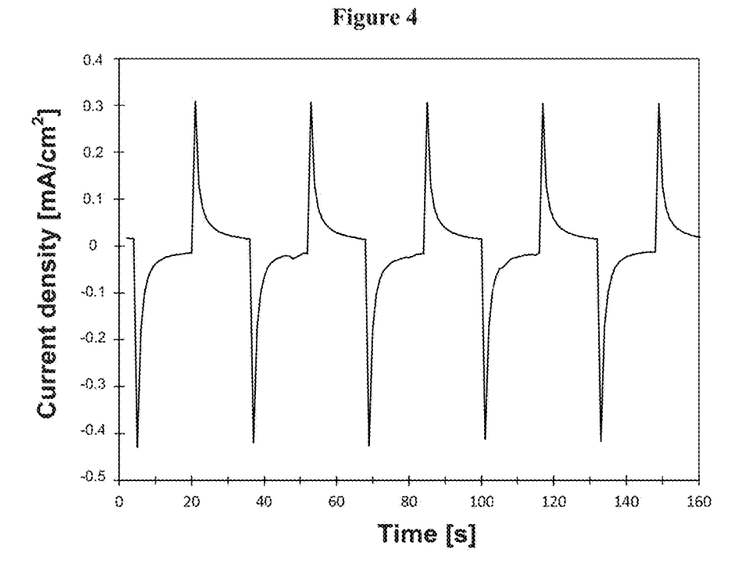
FIG. 4 is an excerpt from the chronoamperometry curves of an electrochromic device of Example 1, according to one embodiment

The electrochromic device from FIG. 2 was then tested in a "solid" system, in the potential range 0 to −0.7 V. The appended FIG. 4 shows an excerpt from the chronoamperometry curves of the electrochromic device thus obtained, the current density (in $mA/cm^2$) being a function of the time (in seconds). This excerpt makes it possible to show the high switching rate of the system. The switching at 90% of the system takes place in less than 2.5 seconds, which is as fast as when assembling with a liquid electrolyte. Furthermore, the surface capacity of the electrochromic device in accordance with the invention is only 0.5 $mC/cm^2$. It therefore appears that an electrochromic layer (EC2) and a current collector (TCO) may advantageously be substituted by a single layer of conductive metal material (MC) acting both as counter electrode and collector. Furthermore, this cyclic chronoamperometry curve associated with the activation of the electrochromic device in accordance with the invention demonstrates the novel electrochemical process presented above that is linked to the reversible oxidation of the MC, since the electrolyte (BMITFSI) is stable in this potential window (−0.7 to 0 V) and hydrophobic (i.e. the decomposition of the water cannot intervene in the electrochromic process). Furthermore, in this case, the use of the silver layer (MC) and of this solid electrolyte makes the electrochromic device ultrafast.

Example 2

Preparation of a 3-Layer Electrochromic Device Using a Solid Electrolyte Based on a Plasticized Ionic Liquid Preparation of the Device In this example, it is shown that the use of a conductive electrochromic material comprising an electrochromic polymer having an electronic conductivity such as, for example, PEDOT and in addition a conductive polymer such as poly(styrene sulfonate) (PSS) makes it possible to reduce the current collector/working electrode assembly to one and the same layer. A three-layer electrochromic device having a vertical sandwich structure was therefore prepared, consisting of the following electrochemical sequence:

transparent support made of polyethylene terephthalate (PET);
working electrode/current collector: single layer of conductive electrochromic material: PEDOT:PSS sold in the form of a commercial ink having the reference Orgacon ICP 1050 (Agfa) deposited on a PET substrate;
solid electrolyte: the electrolyte was prepared using 1-butyl-3-methylimidazolium bis(trifluoromethylsulfonyl) imide (BMITFSI) and 50% by weight of PMMA as plasticizing agent;
counter electrode/current collector: layer of silver metal ink (thickness=5-10 μm);
support for the counter electrode: paper.

This device was produced using PEDOT:PSS film deposited industrially by the roll-to-roll method on a solely PET substrate by in situ copolymerization. The silver metal ink was deposited by flexographic printing on the paper substrate. The solid electrolyte membrane was obtained by mixing BMITFSI (from Solvionic) with 50% by weight of PMMA using butan-2-one as common solvent. The ionic liquid is at this moment liquid. The ionic electrolyte in the liquid state was deposited on the paper substrate covered with the layer of silver ink by application with a doctor blade. The assembly was then heated at a temperature of around 100° C. to eliminate a portion of the butan-2-one so that the electrolyte forms a membrane that is not completely dry. At this moment, the PEDOT/ITO/PET substrate was applied to the surface and the drying was finished off in the oven at a temperature of around 110° C. in order to eliminate the rest of the solvent.

Figure 5:
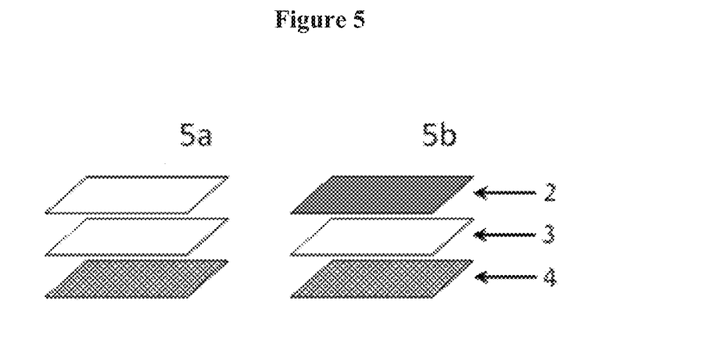
FIGS. 5a and 5b illustrate configurations of the electrochromic device of Example 2, according to one embodiment.

This electrochromic device is represented schematically by the appended FIG. 5, in which it is possible to see the device in the bleached state (FIG. 5a) and in the colored state (FIG. 5b). It consists of an electrochromic working electrode (2), which is separated from the counter electrode (4) by a layer of solid electrolyte (3). The PET support of the conductive electrochromic material and the paper support of the counter electrode are not represented in this figure.

The electrochemical stability of this electrochromic device, studied by chronoamperometric cycling, was evaluated directly in "solid" configuration.

Figure 6:
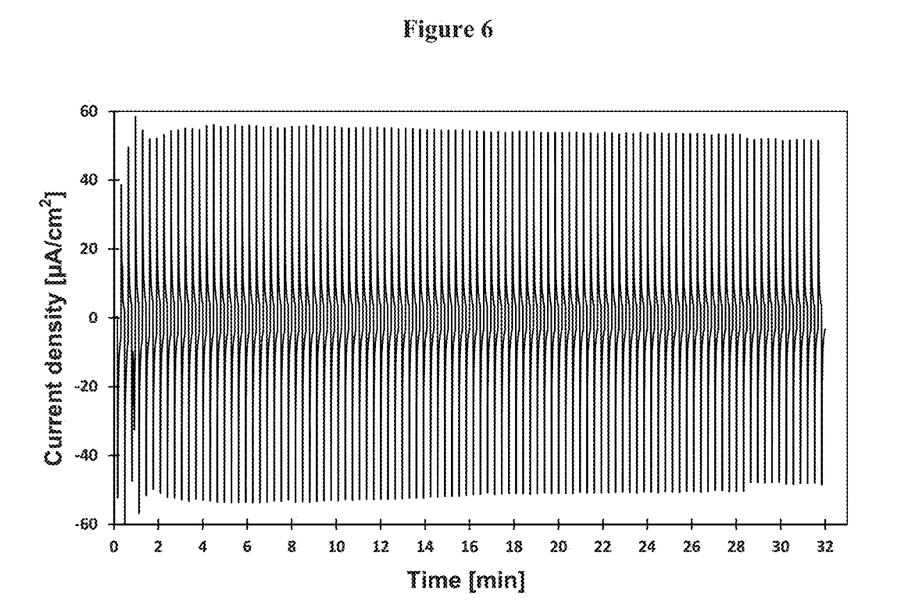
FIG. 6 shows chronoamperometry curves obtained from Example 2, according to one embodiment.

The appended FIG. 6 shows the chronoamperometry curves obtained, the current density (in $\mu A/cm^2$) being a function of the time (in minutes).

Once again, this figure illustrates the good cyclability of this electrochromic device, with a very small loss of capacity during the cycling, which conveys a good stability of this system under the conditions used (−0.7 to 0 V for coloring and bleaching respectively). The use of a material that is both an electronic conductor and electrochromic at the working electrode makes it possible to completely do away with the layers specifically dedicated to the "current collector" function. This allows, in the case of an industrialization of the invention, the production cost of an electrochromic system to be greatly reduced since the use of a substrate coated by a transparent conductive oxide layer produced mainly by physical deposition (PVD) or chemical vapor deposition (CVD) is then no longer required.

Figure 7:
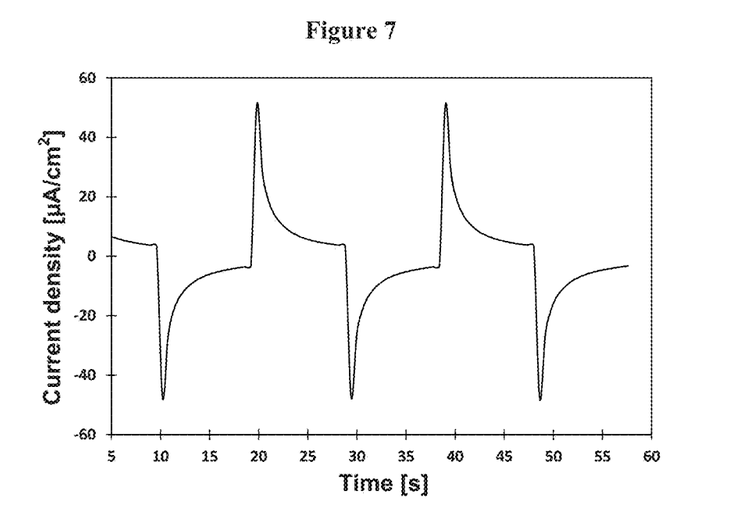
FIG. 7 is an enlargement of the cyclic chronoamperometry curve from FIG. 6, according to one embodiment.

An enlargement of the cyclic chronoamperometry curve from FIG. 6 is presented in the appended FIG. 7. This enlargement makes it possible to assess the switching rate of this system. 90% of the switching of the system is obtained in 3.5 s; furthermore, its electric energy consumption is very low (0.3 $mC/cm^2$).

The performance of this device in accordance with the invention was compared to a conventional 5-layer electrochromic device based on the combination of the electrochromic materials $WO_3$ and LiNiO and the preparation and properties of which are described in the article by H. Moulki et al., Electrochimica Acta., 2012, 74, 46-52. This 5-layer device according to the prior art consisted of the following electrochemical sequence:
- current collector: ITO;
- electrochromic working electrode: PEDOT;
- electrolyte: 0.3M of LiTFSI dissolved in BMITFSI and plasticized using 40% by weight of PMMA;
- counter electrode: Li—Ni—O;
- current collector: ITO, each of the current collectors being furthermore supported by a PET substrate.

Figure 8:
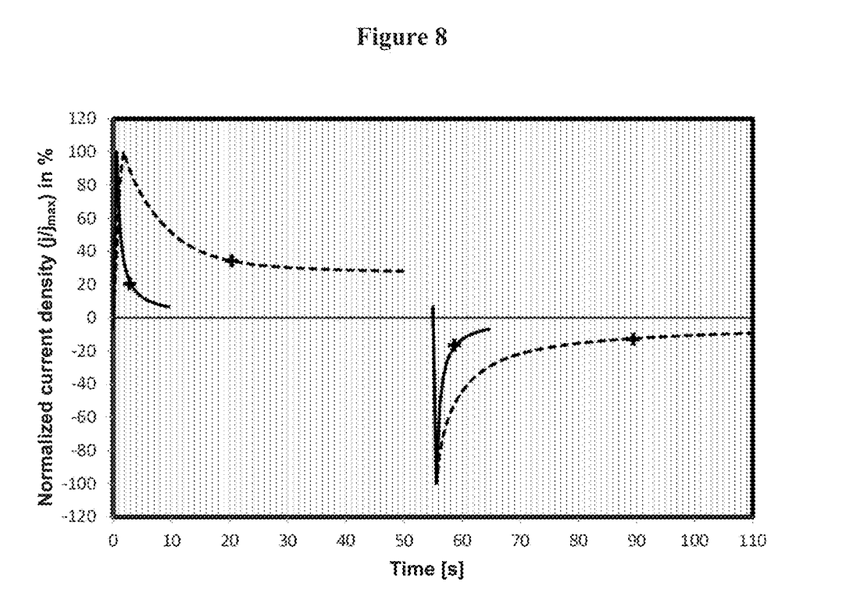
FIG. 8 is a results chart from Example 2, showing the current density/maximum current density ratio (J/Jmax in %) as a function of the time (in s), according to one embodiment.

The results are reported in the appended FIG. 8 in which the current density/maximum current density ratio (J/Jmax in %) is a function of the time (in s). In this figure, the curves of the 5-layer electrochromic device according to the prior art are represented by a dotted line and the curves of the 3-layer electrochromic device according to the present invention are represented as a solid line, the cross appearing on the curves marking the point at 90% of coloring or bleaching.

Regarding the 5-layer electrochromic device according to the prior art, a bleaching time of 20.4 s and a coloring time of 35.4 s were noted.

In comparison, for the 3-layer electrochromic device according to the present invention, a bleaching time of 3 s and a coloring time of 3.5 s were noted.

It appears that the three-layer electrochromic device in accordance with the present invention has a shorter switching time at 90% than a conventional 5-layer system.

Example 3

Preparation of a 3-Layer Electrochromic Device Having an Open Structure

Preparation of the Device

Figure 9:
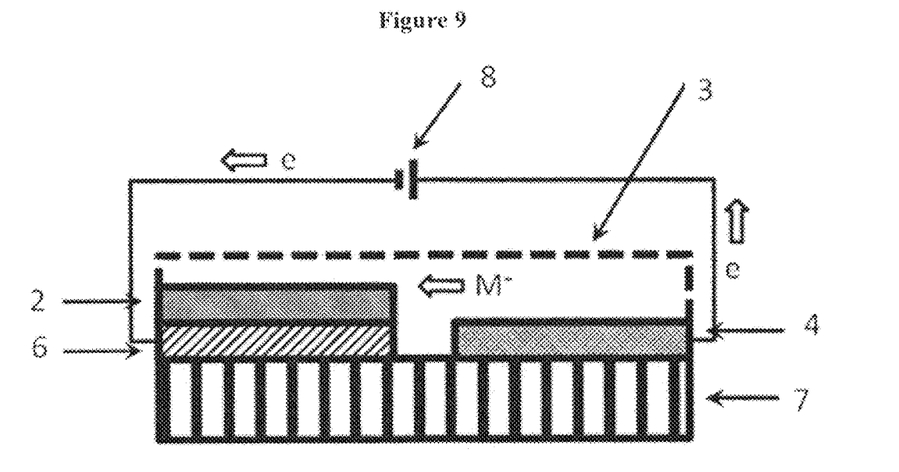
FIG. 9 illustrates a configuration of the electrochromic device of Example 3, according to one embodiment.

In this example, an electrochromic device having an open structure and as represented in the appended FIG. 9 was prepared. This device consists of a paper support (7) on which rests, on one side, a current collector (6) made of silver and, on the other side, a counter electrode (4) made of silver, said collector (6) being surmounted by a working electrode (2) made of electrochromic material (in this example a PEDOT:PSS mixture sold in the form of a commercial ink having the reference Orgacon ICP 1050 (Agfa)), said electrodes (2, 4) are separated from one another by a distance of several micrometers and are covered by a solid electrolyte (3) consisting of a mixture of BMITFSI and 50% by weight of PMMA as plasticizing agent, the current collector (6) and the counter electrode (4) being connected to the terminals of an electric power supply (8) external to the device.

The silver ink was deposited by flexographic printing on the paper substrate using a pattern in order to avoid short-circuits between the two electrodes. The PEDOT:PSS was deposited by application with a doctor blade. A mask was used in order to only cover a single one of the two silver electrodes. The solid electrolyte membrane was obtained by mixing BMITFSI (Solvionic) with 50% by weight of PMMA using butan-2-one as common solvent. The ionic liquid is at this moment liquid. The ionic electrolyte in the liquid state was deposited on the assembly by application with a doctor blade. Everything was dried in the oven at 110° C. in order to solidify the electrolyte.

Figure 10:
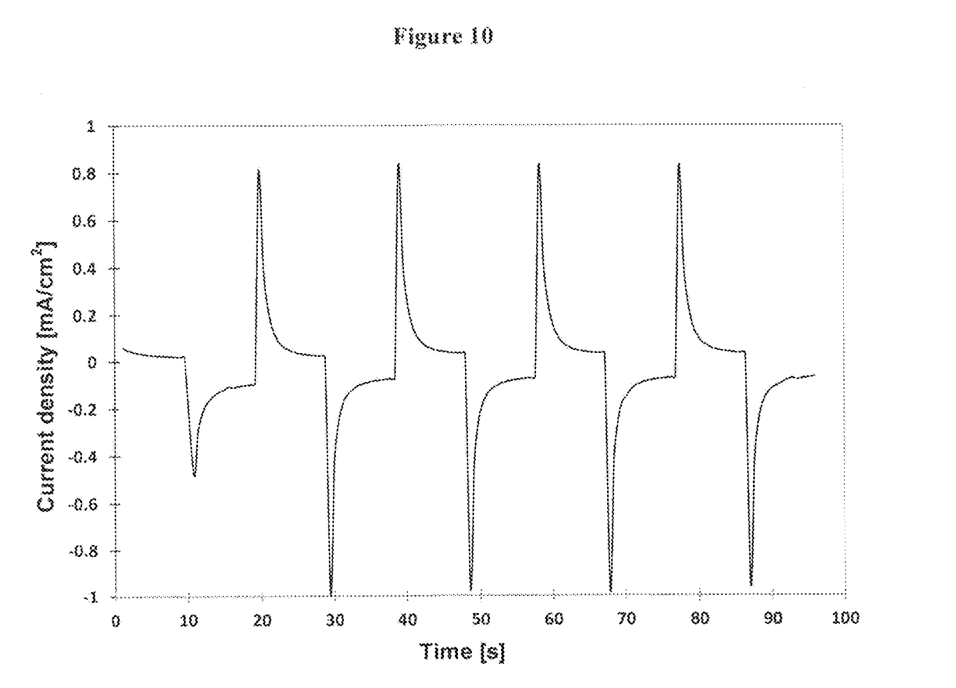
FIG. 10 is a graph of the current density (in $mA/cm^2$) as a function of the time (in min.) from Example 3, in accordance with one embodiment.

The variation of the electric current as a function of the two voltages applied (−0.7 V in the power-on state in order to color the device and 0 V for bleaching it) was then measured and is reported in the form of cyclic chronoamperometry in the appended FIG. 10, in which the current density (in $mA/cm^2$) is a function of the time (in min.).

These results show that the device operates at a very low voltage (0.7 V) in comparison with the conventional electrochromic systems that operate at a higher voltage (around 1.5 V, the difference is in fact greater since it is necessary to apply 1.5 V when coloring and −1.5 V when bleaching, which makes a delta value of 3 V, whereas the electrochromic device in accordance with the invention functions between 0.7 V and 0 V) for an electrical energy consumption of the order of 1 mA. This change in configuration of the electrochromic device relative to that of example 1 (the layers of the current collector, of the electrochromic material forming the working electrode and of the metal counter electrode are no longer superposed, but juxtaposed in the same plane, without being in contact since they are covered by the solid electrolyte) allows a modification of the assembling/printing of the system without greatly modifying its cycling properties. The surface capacity still remains low: 1.3 $mC/cm^2$ and the switching rate is still fast: the switching time at 90% is 4 s.

The invention claimed is:

1. An electrochromic device consisting of only three layers:
   - one layer of electrochromic working electrode having an electrochromic material containing at least one electrochromic polymer;
   - one layer of counter electrode; and
   - one single solid electrolyte layer, wherein the single solid electrolyte layer is in the form of a solid membrane distinct from both said electrochromic working electrode and distinct from said counter electrode, said solid electrolyte being in direct contact with each of said electrodes and said electrolyte layer not containing any electrochromic material;
   - said device additionally having means for applying a voltage to said electrodes,
   wherein;
   - the device has a potential window for operation, including an upper potential of the potential window,
   - wherein said single solid electrolyte layer is of a material selected from the group consisting of:
   i) ionic liquids gelled or plasticized by at least one gelling or plasticizing agent,
   ii) electrolytic solutions of at least one electrolyte salt and/or of at least one acid in solution in a solvent, said solutions being gelled or plasticized by at least one gelling or plasticizing agent, and
   iii) thin layers of a material selected from hydrated oxides selected from the group consisting of hydrated $Ta_2O_5$ and hydrated $ZrO_2$;
   iv) ionic liquids gelled or plasticized by at least one gelling or plasticizing agent and including at least one lithium salt,
   - the counter electrode is solely constructed of a conductive metal material (MC), the redox potential of which corresponds to the upper potential of the potential window for operation of said electrochromic device,
   - the electrochromic material of the working electrode comprises at least one electrochromic polymer additionally having electronic conductivity properties and/or at least one agent that generates an electronic conductivity.

2. The device as claimed in claim 1, wherein the electrochromic polymers additionally having electronic conductivity properties are selected from the group consisting of poly(3,4-ethylenedioxythiophene), poly(3,4-ethylenedioxyselenophene), poly(3,4-propylenedioxythiophene), 4,7-bis (2,3-dihydrothieno[3,4-b][1,4]dioxin-5-yl)-2-phenyl-1H-benzo[d]imidazole, 1,4-bis(2-(3,4-ethylenedioxy)thienyl) benzene, copolymers based on pyrrole and on 3,4-ethylenedioxythiophene, copolymers of 4-aminodiphenylamine and 4,4'-diaminodiphenylsulfone, poly[2,5-di(2-thienyl)-1H-pyrrole-1-(p-benzoic acid)], poly (9H—N-alkyl carbazoles), poly(3,6-dinitro-9H—N-alkyl carbazoles) and poly(3,6-diamino-9H—N-alkyl carbazoles).

3. The device as claimed in claim 1, wherein the ionic liquids are selected from the group consisting of 1-ethyl-3-methylimidazolium bis(trifluoromethane-sulfonyl)imide, 1-butyl-3-methylimidazolium bis(trifluoromethanesulfonyl) imide, 1-butyl-3-methylimidazolium hexafluorophosphate, and mixtures thereof.

4. The device as claimed in claim 1, wherein the electrolyte salts are selected from the group consisting of lithium salts, sodium salts, phosphoric acid and sulfuric acid.

5. The device as claimed in claim 1, wherein the solvent of the electrolytic solutions is a polar aprotic solvent selected from group consisting of cyclic and linear carbonates, cyclic ethers, polyethylene glycol ethers of formula $RO(CH_2CH_2O)_nR'$ wherein R and R' are $CH_3$ or $C_2H_5$, and $1 \leq n \leq 12$, tetraalkyl sulfamides of formula $RR'NSO_2NR''R'''$ wherein R, R', R" and R'" are $CH_3$ or $C_2H_5$, 3-methyl-1,3-oxazolidin-2-one and cyclic esters or an aqueous solvent.

6. The device as claimed in claim 1, wherein the solid electrolyte has a thickness of from 100 nm to 50 μm.

7. The device as claimed in claim 1, wherein the metal material of the counter electrode is selected from the group consisting of copper, iron, silver, platinum and gold.

8. The device as claimed in claim 1, wherein the metal material of the counter electrode is in the form of a solid material, a thin layer or else in the form of a discontinuous material consisting of nanowires positioned on a substrate.

9. The device as claimed in claim 1, wherein the agent that generates an electronic conductivity is selected from the group consisting of conductive polymers and doped semiconducting oxides.

10. An electrochromic device as claimed in claim 1, said device being configured for displaying data, or configured as a component of a motor vehicle rearview mirror and/or visor, or configured of a glazing for a building or infrared optical device.

* * * * *